United States Patent [19]

Farag et al.

[11] Patent Number: 4,768,982
[45] Date of Patent: Sep. 6, 1988

[54] BUS BAR STAB INSULATOR SHROUD

[75] Inventors: Samir F. Farag; Thomas R. Little; John D. Kleinecke, all of Wichita Falls, Tex.

[73] Assignee: Siemens Energy and Automation, Inc., Atlanta, Ga.

[21] Appl. No.: 4,371

[22] Filed: Jan. 15, 1987

[51] Int. Cl.4 .............................................. H01R 13/46
[52] U.S. Cl. ..................................... 439/892; 439/901
[58] Field of Search .............. 439/149, 150, 113, 114, 439/121, 212, 213, 251, 686, 689, 690, 693, 695, 697, 738, 750, 374, 377, 892, 901, 904, 905, 933

[56] References Cited

U.S. PATENT DOCUMENTS 3,128,142 4/1964 Jacobs et al. ........................ 439/376
4,179,174 12/1979 Jorgensen ............................ 439/213
4,564,884 1/1986 Kliemt et al. ....................... 361/353
4,565,908 1/1986 Bould .................................... 200/50

FOREIGN PATENT DOCUMENTS 678095 1/1964 Canada ................................ 439/212
1247444 10/1960 France ................................ 439/212

Primary Examiner—Gil Weidenfeld
Assistant Examiner—Gary F. Paumen
Attorney, Agent, or Firm—Volker R. Ulbrich; John L. James

[57] ABSTRACT

A bus bar stab insulator shroud cooperates with a bus bar stab housing to insulate and protect the stab fingers. The shroud includes an insulative member which has first and second side members connected by a central member which has first and second openings of a size sufficient for receiving stabs of a bus bar stab.

6 Claims, 2 Drawing Sheets

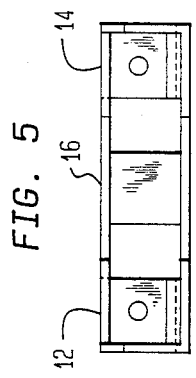
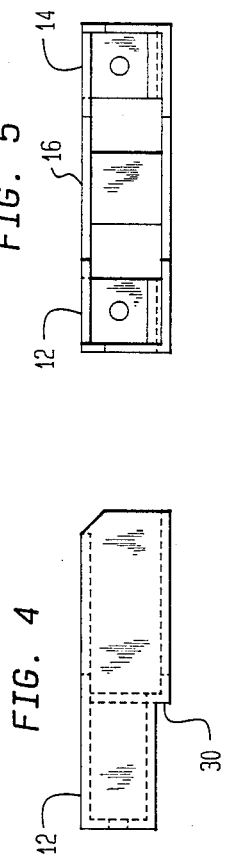
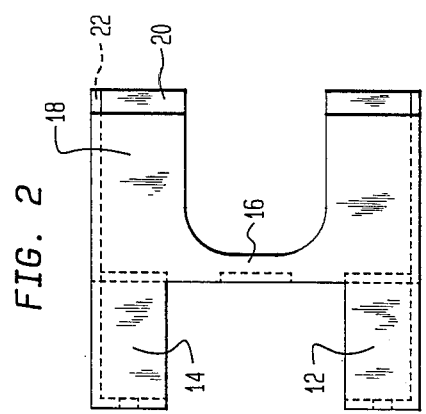
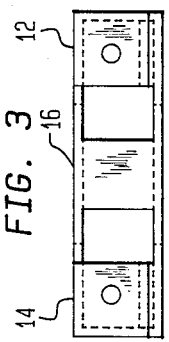

BUS BAR STAB INSULATOR SHROUD

CROSS-REFERENCE TO RELATED APPLICATIONS

This application is related to application Ser. No. 821,617 filed Jan. 23, 1986 for "Bus Bar Stab and Insulator Assembly For A Motor Controller" by Samir F. Farag, John D. Kleinecke and Thomas R. Little.

BACKGROUND OF THE INVENTION

This invention relates to a bus bar stab insulator and more particularly to a shroud which cooperates with the stab insulator to further insulate the bus bar stabs.

Electrical apparatus, such as a motor control center, often has a draw-out type protective device which can be racked-in and racked-out of the control center enclosure to facilitate maintenance, testing and installation. The draw-out protective device, which may be a fusible disconnect switch or a circuit breaker, is typically mounted on a carriage assembly which can be racked-out and put racked-in the control center housing. This requires the making and breaking of contact between the protective device mechanism itself and current carrying conductors in the enclosure. A stab assembly is used to make the connection between the draw-out protective device and the bus bars.

While insulated housings have been devised for bus bar stab assemblies, there is still room for improvement. For example, typical stab assemblies usually have fingers for contacting the bus bars. These fingers normaly protrude from the stab insulator housing. It is desirable to have resilient fingers which further exposes the fingers which must remain free of interference to remain resilient. When the fingers are exposed, they collect dust and may come in contact with other objects. It will be appreciated that it would be highly desirable to provide a housing for the fingers which would protect them from dust and debris, yet, not interfere with their resilience.

Accordingly, it is an object of the present invention to provide a shroud which cooperates with the housing to insulate the stab assembly.

Another object is to provide a shroud which protects the stab fingers from debris while not interfering with their operation.

Another operation is to provide a shroud which is simple and inexpensive to manufacture.

SUMMARY OF THE INVENTION

Briefly stated, in accordance with one aspect of the invention, a bus bar stab insulator shroud includes an insulative member which has first and second side members connected by a central member which has first and second openings of a size sufficient for receiving stabs of a bus bar stab. The shroud cooperates with a bus bar stab insulator and provides extra insulation for the stabs of the bus bar stab assembly.

BRIEF DESCRIPTION OF THE DRAWINGS

While the specfication concludes with claims particularly pointing out and distinctly claiming the subject matter which is regarded as the invention, it is believed that the invention would be better understood from the following description of the preferred embodiment taken in conjunction with the accompanying drawings in which:

FIG. 2 is a top view of the shroud;
FIG. 3 is a left end view of the shroud;
FIG. 4 is a side view of the shroud;
and
FIG. 5 is a right end view of the shroud.

DESCRIPTION OF THE PREFERRED EMBODIMENT

Figure 1:
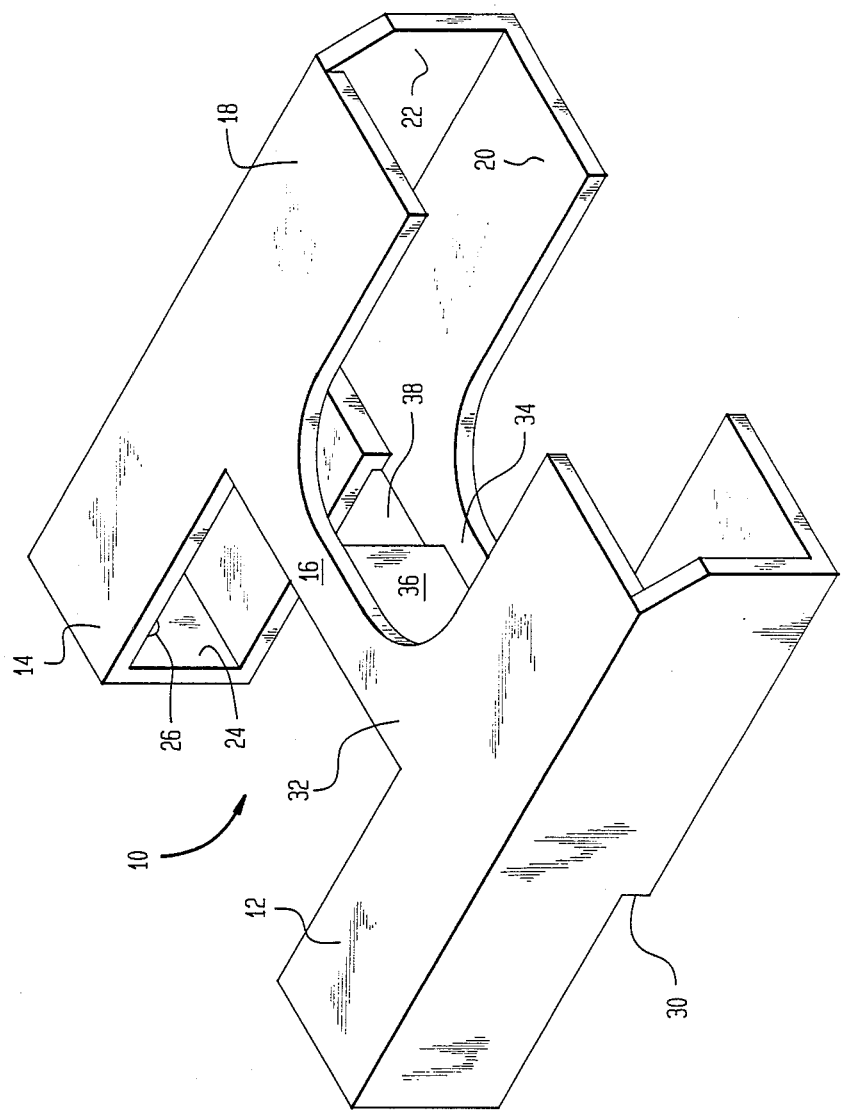
FIG. 1 is an isometric view of a shroud for a bus bar stab insulator assembly.

Referring to FIGS. 1–5, a shroud 10 is provided for a bus bar stab insulator assembly of the type used for a plug-in bus bar stab assembly as is more fully described in co-pending application Ser. No. 821,617, filed Jan. 23, 1986, for "Bus Bar Stab and Insulator Assembly For A Motor Controller" and which is incorporated herein by reference. The bus bar shroud 10 is preferably a one-piece assembly which is formed of an insulative material as in known in the art. The shroud 10 includes left and right elongate side members 12, 14, one of which is the mirror image of the other. The left and right side members 12, 14 are connected by a central member 16.

Since the left and right side members 12, 14 are mirror images of one another, only the right side member 14 will be explained in detail herein. It is understood that each component of the right side member 14 has its counterpart in the left side member 12. As is seen in FIG. 1, more detail is shown of the right side member 14 than of the left member 12 and accordingly, the right side member 14 will be described in detail herein. The right side member 14 has an elongate box-like configuration with one side and one end of the box being open. The right member 14 includes a top member 18 and a bottom member 20. Each of these members 18, 20 are elongate members having a generally rectangular configuration. The top and bottom members 18, 20 are oriented parallel to one another and are spaced apart a preselected distance. The top and bottom members 18, 20 are each connected to a side member 22 which is also of a generally rectangular configuration extending between the top and bottom members 18, 20. The side member 22 is connected to the top and bottom members 18, 20 and is perpendicular to each of these members.

One end of the top, bottom and side elongate members 18, 20 and 22 are closed off by an end member 14. The end member 24 also has a rectangular configuration but is nearly square in the preferred embodiment. The end member 24 has an opening 26 therein which receives a screw for connecting the shroud to the bus bar stab assembly. The other end of the elongate top, bottom and side members 18, 20 and 22 is open. The open end of the elongate side member has the upper corner truncated. The truncated corner is adjacent the top member 18 and facilitates easy insertion of the bus bar stab into the connector when it is desired to make an electrical connection.

The height of the elongate side member 22 is preferably less at the closed end than at the open end. The height makes an abrupt change in the mid portion of the right side of the side 22 to fit the configuration of the bus bar stab assembly. Accordingly, the bottom elongate member 20 has a step in its mid portion at the point that the abrupt change in height occurs in the side member 22. At the point that the abrupt change in height occurs in the side member 22 and the change occurs in the bottom member 20, there is a bridging member which bridges the two end portions of the bottom member 20 together. This bridging member 30 extends all the way from the right elongate member 14 to the left elongate member 12. These changes are preferred so that the shroud perfectly fits the stab insulator housing, but the shroud is still fully useable even when these changes are not present.

The central portion 16 of the shroud 10 also includes a top member 32 and a bottom member 34 which are oriented parallel to one another and parallel to the top and bottom members 18 and 20. The top and bottom members 32, 34 of the central member 16 are co-planar with the respective top and bottom members of the left and right elongate members 12, 14. The top and bottom members 32, 34 of the central member are connected by a vertical member 36 extending between the top and bottom members 32, 34 and perpendicular thereto. This vertical member 36 does not extend to the right side member 22 but is spaced therefrom leaving an opening 38 through which one of the bus bar stabs extends. The bottom portion of the vertical member 36 is the cross panel 30.

As illustrated in the drawings, the area between the left elongate member, the central member 16 and the right elongate member 14 toward closed end of the right elongate member 14 is open and is of a generally rectangular configuration. On the other hand, the open area on the open end side of the central member 16 is not of a rectangular configuration but rather has rounded corners between the central member 16 and the top elongate members of the left and right elongate members. This curve configuration causes the top members to be thicker in this area and therefore more rigid and strong.

While operation of the shroud is believed to be apparent from the drawings and the foregoing description, a few words will be added for amplification. The shroud is used by inserting the closed end of the shroud into openings which exist in the bus bar stab insulator assembly. When inserted the left stab of the central stab assembly for a three-phase bus bar stab insulator assembly protrudes through the opening which exists between the vertical member 36 and the left side member. Similarly, the right-hand stab of the stab central stab assembly extends through the opening 38 which exists between the vertical member 36 and the right-side member 22. The shroud is inserted and pushed well into the openings provided in the bus bar stab insulator assembly. Screws are now inserted through the opening 26 to secure the shroud to the insulator assembly. The shroud is now completely installed and the insulator assembly is ready to use. The insulator assembly is used by simply pushing the bus bar stab insulator assembly onto the bus bars. The shroud insulates the bus bar stabs which would otherwise be more exposed and more subject to contact by an installer or other user.

It will now be understood that there has been presented a bus bar stab insulator shroud which is simple in construction and easy to use but which provides extra insulation to otherwise exposed bus bar stabs. The shroud does not interfere with the action of the stab fingers.

As will be evident from the foregoing description, certain aspects of the invention are not limited to the particular details of the examples illustrated, and it is therefore contemplated that other modifications or applications will occur to those skilled in the art. It is accordingly intended that the claims shall cover all such modifications and applications as do not depart from the true spirit and script of the invention.

What is claimed as new and desired to be secured by Letters Patent of the United States is:

1. A bus bar stab insulator shroud, comprising:
   a left portion having a top member, a bottom member, a left side member and an end member, said top and bottom members having a generally planar configuration and being oriented generally parallel to one another, said left side member having a generally planar configuration and being connected to the top and bottom members and being perpendicular thereto, said end member having an opening therein of a size sufficient for receiving a screw and being connected to the top, bottom and side members and perpendicular thereto forming a box-like configuration with one end opening and one side opening;
   a right portion having a top member, a bottom member, a right side member, and an end member, said top and bottom members having a generally planar configuration and being oriented parallel to one another, said right side member having a generally planar configuration and being connected to the top and bottom members and oriented perpendicular thereto, said end member having an opening therein of a size sufficient for receiving a screw and being connected to the top, bottom and side members forming a box-like configuration with one side open and one end open; and
   a central portion extending between the left and right portions and being connected thereto, said central portion having a top member connected to the top members of the first and second portions, a bottom member connected to the bottom members of the first and second portions and having a vertical member extending between the top and bottom members and being oriented perpendicular thereto, said vertical member and said left side member forming a first stab opening and said vertical member and said right side member forming a second stab opening.

2. A shroud according to claim 1, wherein the bottom member of the left portion includes first and second planar portions which are connected by a third planar portion.

3. A shroud according to claim 2, wherein the third planar portion is perpendicular to the first and second planar portions.

4. A shroud according to claim 1, wherein the left portion, the right portion and the central portion define a rectangular opening which extends between the left and right portions and from the central portion toward the end portions of the left and right portions.

5. A shroud according to claim 1, wherein the left and right side portions and the central portion define an opening which extends between the left and right portions and from the central portion toward an open end of the left and right portions.

6. A shroud according to claim 5, wherein the opening has arcuate corners.

* * * * *